(No Model.)

J. S. SHOEMAKER.
ROAD CART.

No. 505,333. Patented Sept. 19, 1893.

Witnesses
A. L. Hobbie
Wm. B. Dogherty.

Inventor
Jacob S. Shoemaker
By Thos. S. Sprague & Son
Attys.

UNITED STATES PATENT OFFICE.

JACOB S. SHOEMAKER, OF NEW LOTHROP, MICHIGAN.

ROAD-CART.

SPECIFICATION forming part of Letters Patent No. 505,333, dated September 19, 1893.

Application filed June 19, 1893. Serial No. 478,188. (No model.)

*To all whom it may concern:*

Be it known that I, JACOB S. SHOEMAKER, a citizen of the United States, residing at New Lothrop, in the State of Michigan, have invented certain new and useful Improvements in Road-Carts, of which the following is a specification, reference being had therein to the accompanying drawings.

The invention consists in the peculiar construction of the frame and seat support, and further in the peculiar construction and arrangement of the spring support for the seat and further in the peculiar construction, arrangement and combination of the various parts.

Figure 1:
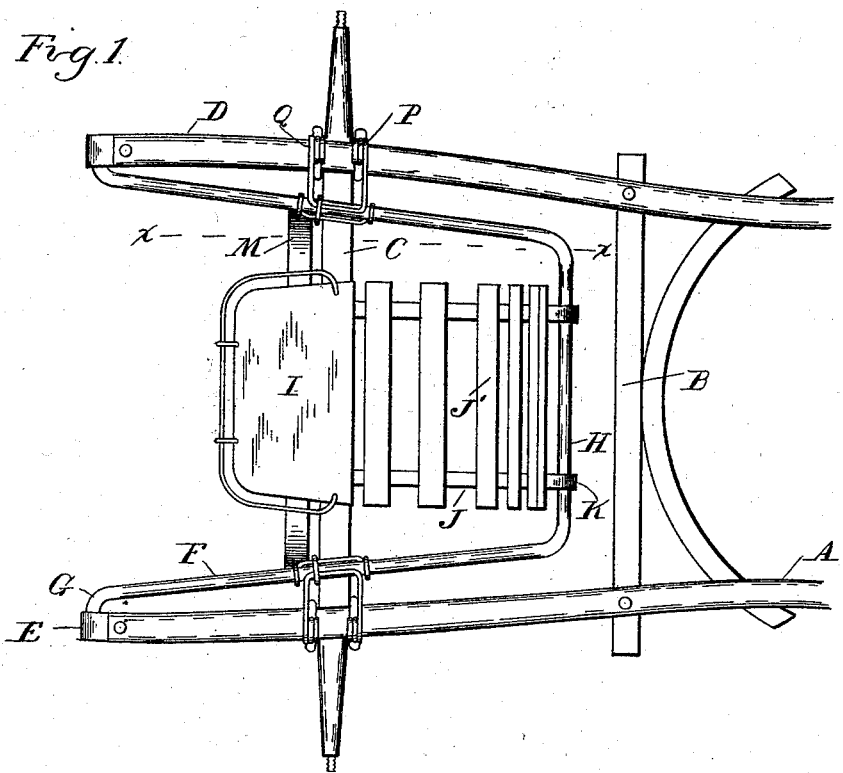
Figure 2:
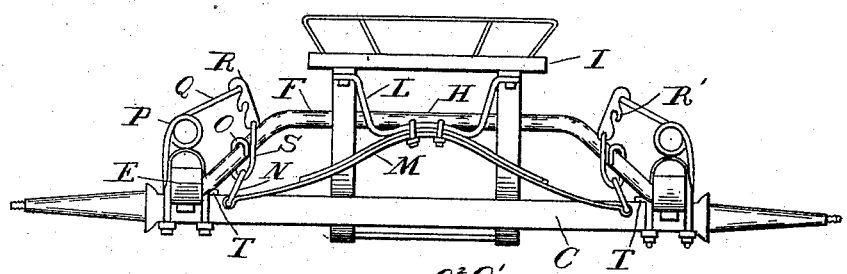
Figure 3:
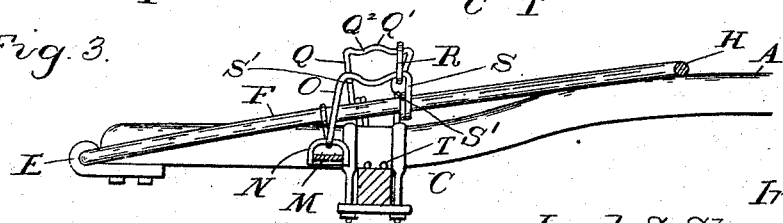

In the drawings, Figure 1 is a plan view of my improved cart, the wheels not shown. Fig. 2 is a rear elevation thereof. Fig. 3 is a vertical section on line $x$ $x$ Fig. 1.

A are the shafts.

B is the cross-bar connecting the shafts.

C is the axle.

D are rearward extensions of the shaft. E are boxes secured at the rear end of such extensions.

F is a seat supporting frame journaled at its rear end in the boxes E and extending forwardly over the axles. This frame I preferably make of a single piece of metal bent into substantially U shape, having the offsets G at its rear end forming the bearings which engage in the boxes, and the cross-bar H at the forward end extending parallel with the cross-bar B of the shafts and free therefrom. This frame preferably extends at a slight inclination from its rear end forwardly toward its front end.

I is the seat.

J are two curved bars connected on the under side to the seat and forming with the slats J' the crate or basket in which the driver rests his feet.

K are hooks or eyes at the forward ends of the bars J, engaging over the crossbar H of the seat supporting frame.

L is a depending seat bracket on the under side of the seat.

M is a semi-elliptical spring on which this bracket rests and to which it is centrally secured.

N are clevices at the end of the spring which are suspended from the eyes O on the seat supporting frame, preferably slightly in rear of the axle.

The seat supporting frame is suspended by springs from the cart frame in any desired manner. That which I prefer and have shown consists of the coiled springs P having the inwardly extending spring arm Q. These springs are separated and the arms are connected together by means of a cross-bar Q' having notches or indentations $Q^2$ at each end with which the suspending link R is adapted to engage. This suspending link is preferably provided with a series of hooks R' and at its lower end slidingly engages with the bail S secured to the seat supporting frame beneath the cross-bar Q' and preferably provided with corresponding notches S'. The springs P are secured to the axle or to the shaft by arms T which preferably engage between the shaft and axle and are clipped thereto. The spring P I preferably make in a single piece as plainly shown in the drawings.

To adjust the cart to different loads the link R' is moved forward or backward lengthening or shortening the distance between the pivotal point of the seat supporting frame. I have found that a cart thus constructed largely dispenses with the obnoxious horse motion and produces an easy riding vehicle, the spring being arranged to take up the various inequalities in the road with the greatest comfort to the rider.

What I claim as my invention is—

1. In a road cart, the combination of the axle, the frame extending rearwardly of the axle, a seat supporting frame pivoted at the rear end of said extension and springs on the frame of the vehicle supporting the free end of said supporting frame.

2. In a road cart, the combination of the frame extending rearwardly of the axle, a seat supporting frame pivoted in such rearward extension, springs on the vehicle frame supporting the free end of such seat supporting frame, a seat and a seat spring suspended from the seat supporting frame, substantially as described.

3. In a road cart, the combination of the axle, the frame extending rearwardly thereof, a seat supporting frame pivoted in said rearward extension, the seat a basket or crate, a connection between the forward ends of the basket and the forward end of the supporting frame, a semi-elliptical spring suspended centrally of the seat supporting frame and a spring support on the vehicle frame for the seat supporting frame.

4. In a road cart, the combination of the axle, the shafts extending rearwardly thereof having boxes at their rear ends, the frame F pivoted in said boxes and extending forwardly above the axle, the seat and crate bars J extending downwardly and forwardly from the seat, supported at the forward end of the frame F, the semi-elliptical seat spring suspended from the frame F in rear of the axle, the coiled springs P on the shafts, and links R' from which the seat supporting frame is suspended upon the springs P, substantially as described.

5. In a road cart, the combination of the axle, the shafts extending rearwardly thereof, the forwardly extending frame pivoted at the rear ends of the shafts, the seat supported thereon, of the springs on the vehicle frame, a bail on the hinged frame beneath the spring and a link longitudinally adjustable connecting the bail and spring, substantially as described.

In testimony whereof I affix my signature in presence of two witnesses.

JACOB S. SHOEMAKER.

Witnesses:
M. B. DOGHERTY,
OTTO F. BARTHEL.